US010476302B2

United States Patent
Walley et al.

(10) Patent No.: US 10,476,302 B2
(45) Date of Patent: Nov. 12, 2019

(54) WIRELESS POWER TRANSFER LOAD MODULATION ENHANCEMENT

(71) Applicant: Broadcom Corporation, Irvine, CA (US)

(72) Inventors: John Stuart Walley, Ladera Ranch, CA (US); Ryan Michael Desrosiers, Fort Collins, CO (US); Vadim Bishtein, Sunnyvale, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 398 days.

(21) Appl. No.: 15/279,323

(22) Filed: Sep. 28, 2016

(65) Prior Publication Data

US 2017/0098966 A1    Apr. 6, 2017

Related U.S. Application Data

(60) Provisional application No. 62/236,821, filed on Oct. 2, 2015.

(51) Int. Cl.
| | |
|---|---|
| *H02J 50/10* | (2016.01) |
| *H02M 3/155* | (2006.01) |
| *H02M 7/219* | (2006.01) |
| *H01F 38/14* | (2006.01) |
| *H02M 1/00* | (2006.01) |

(52) U.S. Cl.
CPC ............. *H02J 50/10* (2016.02); *H02M 3/155* (2013.01); *H02M 7/219* (2013.01); *H01F 38/14* (2013.01); *H02M 2001/007* (2013.01)

(58) Field of Classification Search
CPC .. H02J 50/10; H02J 5/005; H02J 7/025; H02J 17/00; H02M 7/219; H02M 3/155; H02M 2001/007; H04B 5/0025–0093; B60L 11/182; B60L 11/1829; Y02T 90/122; H01F 38/14; H01F 2038/143–146
See application file for complete search history.

(56) References Cited

U.S. PATENT DOCUMENTS

| | | | |
|---|---|---|---|
| 2012/0228956 A1* | 9/2012 | Kamata ................. | H02J 7/0027 307/104 |
| 2013/0093256 A1* | 4/2013 | Choi ....................... | H02J 17/00 307/104 |
| 2015/0115730 A1* | 4/2015 | Kanno .................... | H02J 5/005 307/104 |
| 2015/0124858 A1* | 5/2015 | Fonseca ............... | H04B 1/0458 375/219 |

(Continued)

*Primary Examiner* — Rexford N Barnie
*Assistant Examiner* — Terrence R Willoughby
(74) *Attorney, Agent, or Firm* — Morgan, Lewis & Bockius LLP

(57) ABSTRACT

A wireless power transfer (WPT) receiver circuit includes a receive coil to couple to a transmit coil of a WPT transmitter circuit. A rectifier is coupled to the receive coil to generate a rectified voltage. The rectifier comprises a bridge rectifier circuit including a first set of switching elements. A load modulation circuit facilitates communication between the WPT receiver circuit and the WPT transmitter circuit. The load modulation circuit includes a single modulation capacitor and one or more modulation switching elements. At least one node of one of the modulation switching elements is connected to an input node of the rectifier.

20 Claims, 6 Drawing Sheets

(56) References Cited

U.S. PATENT DOCUMENTS

2016/0156229 A1* 6/2016 Sakata .................. H02J 17/00
　　　　　　　　　　　　　　　　　　　307/104
2016/0226296 A1* 8/2016 Bae ......................... H02J 5/00
2017/0229911 A1* 8/2017 Ettes ...................... H02J 5/005
2018/0219419 A1* 8/2018 Ettes .................. H02M 3/3376

* cited by examiner

WIRELESS POWER TRANSFER LOAD MODULATION ENHANCEMENT

CROSS-REFERENCE TO RELATED APPLICATIONS

This application claims the benefit of priority under 35 U.S.C. § 119 from U.S. Provisional Patent Application 62/236,821 filed Oct. 2, 2015, which is incorporated herein by reference in its entirety.

TECHNICAL FIELD

The present description relates generally to wireless charging, and more particularly, to wireless power transfer load modulation enhancement.

BACKGROUND

Hand-held devices including wireless communication devices such as mobile phones, tablets, phablets, and personal digital assistant (PDA) are good candidates for using wireless power transfer (WPT) technology for battery charging. In WPT, energy is transferred from a power source to an electrical load without using an electrically conductive medium such as a wire for power transmission. Instead, the power transfer can take place wirelessly by using time-varying electric, magnetic, or electromagnetic fields. The wireless energy transfer is from a wireless power transmitter connected to power source to one or more wireless power receivers that receive the energy through an intervening space.

Common WPT technologies include magnetic resonance coupling, electromagnetic induction, and radiative power transfer. The magnetic resonance and electromagnetic induction solutions are used for short distances, whereas the radiative solution, also known as power beaming, is a far-field solution. The power beaming technique is mostly considered for use by solar power satellites and drones that receive electrical power from one or more beams of electromagnetic radiation such as microwave or laser. In the magnetic resonance coupling, the energy transfer is based on resonance between magnetic coils of the power transmitter and the power receiver devices. In the electromagnetic induction technique, inductive coupling between coils of the power transmitter and the power receiver devices is used for the wireless power transfer. Both of the magnetic resonance coupling and electromagnetic induction techniques are based on high-frequency electromagnetic radiation in the range of a few hundred KHz to a few MHz (e.g., about 100 KHz-10 MHz), and their transmission efficiency is a function of the product of the coil Q-factor and the coupling coefficient between the coils.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

In one or more aspects of the subject technology, a device and circuits are provided for wireless power transfer (WPT) load modulation enhancement. The subject technology enables reducing the number of capacitors of the load modulation circuit and the number of semiconductor chip pins used by the load modulation circuit. In some aspects, the disclosed technology allows configuring the desired load impedance of various standards in a multi-standard receiver by changing a series resistance. In one or more aspects, external capacitors can be used to reduce power consumption during modulation. In some aspects, modulation capacitors can be replaced by on-chip or external resistors to create a fixed or a variable modulation resistance. In some aspects, the subject solution changes the modulation strength and/or the amount of oscillation dampening and reduces power dissipation and ripples on the rectified voltage.

Figure 1:
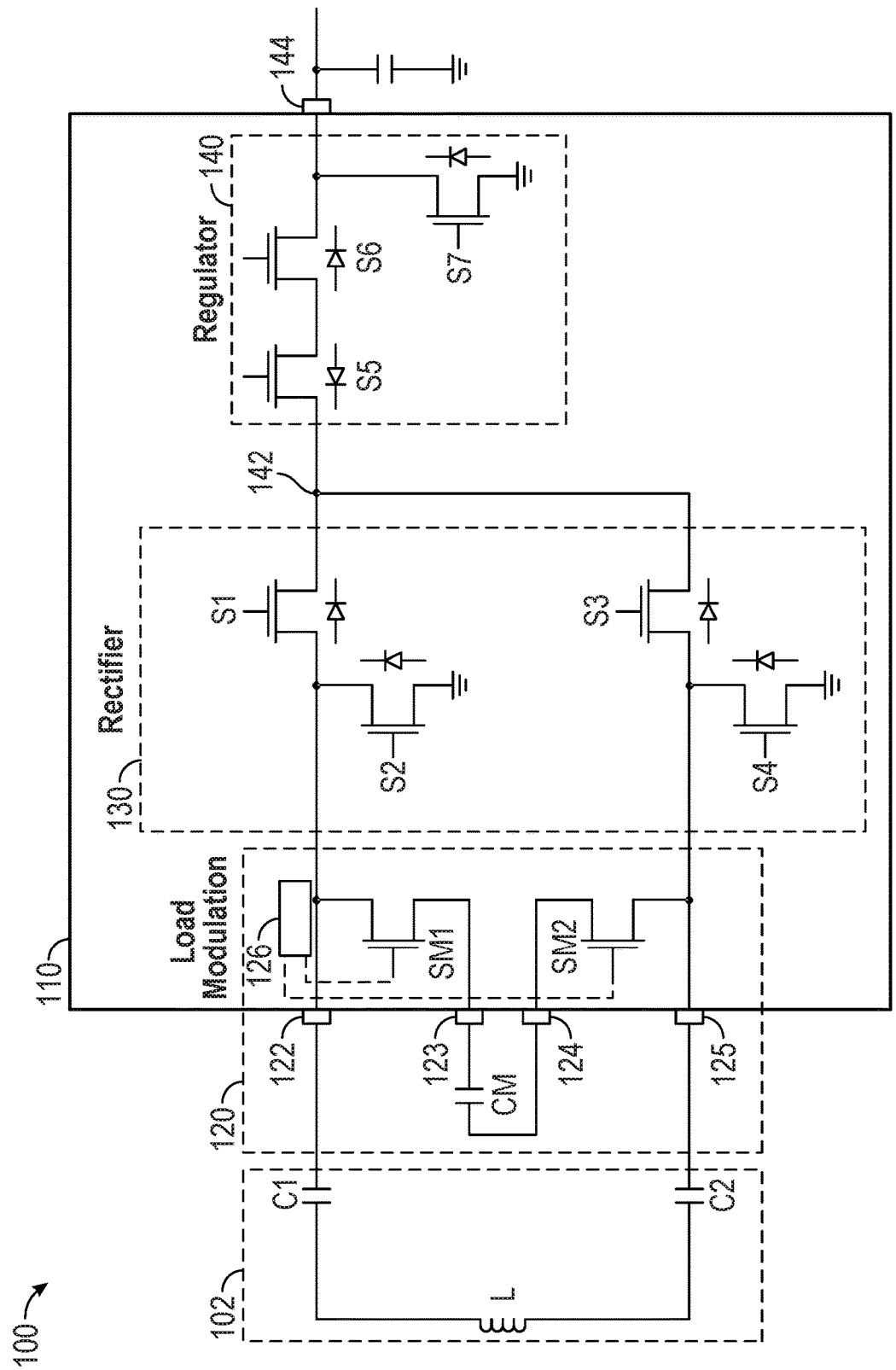
FIG. 1 is a schematic diagram illustrating an example of a wireless power transfer (WPT) receiver including a load modulation circuit according to aspects of the subject technology.

FIG. 1 is a schematic diagram illustrating an example of a wireless power transfer (WPT) receiver 100 including a load modulation circuit 120 according to aspects of the subject technology. The WPT receiver 100 includes a magnetic coupling circuit 102, a rectification and regulator circuit 110 and the load modulation circuit 120. The magnetic coupling circuit 102 includes a coupling inductor L and tuning capacitor C1 and C2. The coupling inductor L is a receiver coil that magnetically couples to a transmit coil of a WPT transmitter that is positioned near the WPT receiver 100. In one or more implementations, the magnetic coupling between the receive and transmit coils is a magnetic resonance coupling that provides a highest amount of coupling at a resonance frequency (e.g., 6.78 MHz for the AirFuel wireless standard). The tuning capacitor C1 and C2 can be fixed or variable capacitors and their capacitance values can set the resonance frequency. The WPT transmitter circuit (not shown for simplicity) can be powered by the power line and can induce an excitement current (e.g., a sinusoidal current) into the coupling inductor L, which results in an AC input voltage (e.g., a sinusoidal voltage) at input nodes of the rectification and regulator circuit 110 (e.g., pins 122 and 125). The amplitude of the AC input voltage can be changed, for example, by changing the frequency of the excitation current away or close to the magnetic resonance frequency.

The magnetic coupling between the transmit coil and the receive coil L depends, among other factors, on the physical distance of these coils. For example, if the distance is too far for the magnetic coupling to induce a desired power level in the WPT receiver 100, a signal is communicated to the WPT transmitter to alert the WPT transmitter. In response, the WPT transmitter can either increase the excitement current, or if that is not possible, inform the WPT receiver 100 by sending a signal back to alert a user of the WPT receiver 100 to take a suitable action. The communication between the WPT transmitter and the WPT receiver 100 can take place through a communication channel. In some implementations, the communication channel is provided via load modulation that in the receiver side can be implemented using the load modulation circuit 120.

The rectification and regulator circuit 110 includes a rectifier 130 and a regulator 140. In some implementations, the rectification and regulator circuit 110 is a chip with inputs pins 122, 123, 124, and 125 and an output pin 144. The rectifier 130 is a bridge rectifier including switches S1, S2, S3, and S4 and can rectify the AC input voltage (e.g., a sinusoidal voltage) provided between the pins 122 and 125 and provide a rectified voltage (Vrect) at an output node 142 of the rectifier 130. In some aspects, the switches S1, S2, S3, and S4 are field-effect transistor (FET) switches. The FET switches S1 and S3 are referred to as the high-side FET switches and one of them is on (conducting) at any half cycle of the AC input voltage. For example, when the voltage at the pin 122 is positive (e.g., at positive cycle of the AC input voltage), the FET switch S1 is on and the FET switch S3 is off (non-conducting). Similarly, one of the FET switches S2 and S4, referred to as the low-side FET switches, is on at any half cycle of the AC input voltage. For example, when the voltage at the pin 122 is positive, the FET switch S2 is off and the FET switch S4 is on. The conducting states (e.g., on or off) of the FET switches S1, S2, S3, and S4 are controlled via voltages applied to their respective gate terminals by a gate-drive control circuit, not shown here for simplicity.

In some implementations, the regulator 140 is a switching regulator such as a buck regulator or a low-drop-out (LDO) regulator that can convert the rectified voltage (Vrect) to a regulated DC output voltage at an output pin 144. The regulator 140 includes FET switches S5, S6, and S7 which are controlled by applying suitable gate voltages to gate terminals of the FET switches.

The load modulation circuit 120 includes a modulation capacitor CM coupled between the pins 123 and 124 of the rectification and regulator circuit 110 (e.g., a chip), the modulation switches (e.g., FET switches such as power FET switches) SM1 and SM2, and a modulation control circuit 126. The voltages of gate terminals of the FET switches SM1 and SM2 are controlled by the modulation control circuit 126. The modulation control circuit 126 can apply a modulation pulse to the gate terminal of the FET switch SM1 and SM2. In some aspects, the modulation control circuit 126 controls amplitude and pulse-width of the modulation pulse to control the modulation strength of the load modulation circuit 120. In one or more aspects, the modulation control circuit 126 can be implemented with known circuitry including analog and/or digital circuits.

In some implementations, the functionalities of the modulation control circuit 126 can be performed by, for example, a processor such a general processor or a microcontroller of a host device (e.g., a mobile phone) that includes the WPT receiver 100. In one or more aspects, the modulation scheme used by the modulation control circuit 126 is an amplitude-shift-keying (ASK) modulation scheme. The ASK modulation represents digital data as variations in the amplitude of a carrier wave. In an ASK system, the binary symbol 1 is represented by transmitting a fixed-amplitude carrier wave and fixed frequency for a bit duration of T seconds. If the signal value is 1 then the carrier signal will be transmitted, otherwise, a signal value of 0 will be transmitted.

It is noted that the previous solutions used two modulation capacitors (e.g., with capacitance values of about 20-60 nF at a few hundred KHz frequency) which are replaced by the single modulation capacitor CM of the disclosed load modulation circuit 120, thus saving one capacitor. The single modulation capacitor CM may have half of the capacitance value of the two modulation capacitors. It is understood that the operating frequency varies in the range of about 100-200 KHZ for wireless power consortium (WPC) standard and in the range of about 100-400 KHZ for power matters alliance (PMA) and or AirFuel inductive standards.

FIGS. 2A-2D are schematic diagrams illustrating an example of a WPT receiver circuit 200A with improved load modulation circuit and corresponding evolution path circuits 200B through 200D, according to aspects of the subject technology. The WPT receiver circuit 200A includes a magnetic coupling circuit 202, a load modulation circuit 220, a rectifier 230, and a regulator 240. The magnetic coupling circuit 202 is similar to the magnetic coupling circuit 102 of FIG. 1, described above. The rectifier 230 is similar to the rectifier 130 of FIG. 1 and includes high-side FET switches S1 and S3 and low-side FET switches S2 and S4. In some implementations, the low-side FET switches S2 and S4 can be finger FETs with multiple (e.g., two) fingers. For example, the FET switch S2 can be implemented as two FET switches S2-1 and S2-2. Similarly, the FET switch S4 can be implemented as two FET switches S4-1 and S4-2. The finger FET realization of the low-side FET switches S2 and S4 is beneficial in the implementation of the load modulation circuit 220, as explained below. The regulator 240 can be a switching regulator such as an LDO regulator or a buck regulator, as explained above.

The load modulation circuit 220 does not include any modulation capacitor (e.g., CM of FIG. 1) and only includes modulation switch FETs S2-2 and S4-2, which are modulated by a modulation control circuit, such as the modulation control circuit 126 of FIG. 1 described above. In some aspects, the modulation switch FETs S2-2 and S4-2 are part of the rectifier low-side FET switches S2 and S4. In other words, the subject technology can further enhance the load modulation circuit 120 of FIG. 1 by achieving load modulation without the modulation capacitor CM and the modulation FET switches SM1 and SM2 of FIG. 1 and leveraging two fingers of the low-side FET switches S2 and S4 of the rectifier 230. This can be understood by the analysis of the evolution path circuits 200B through 200D, described herein.

Figure 2A:
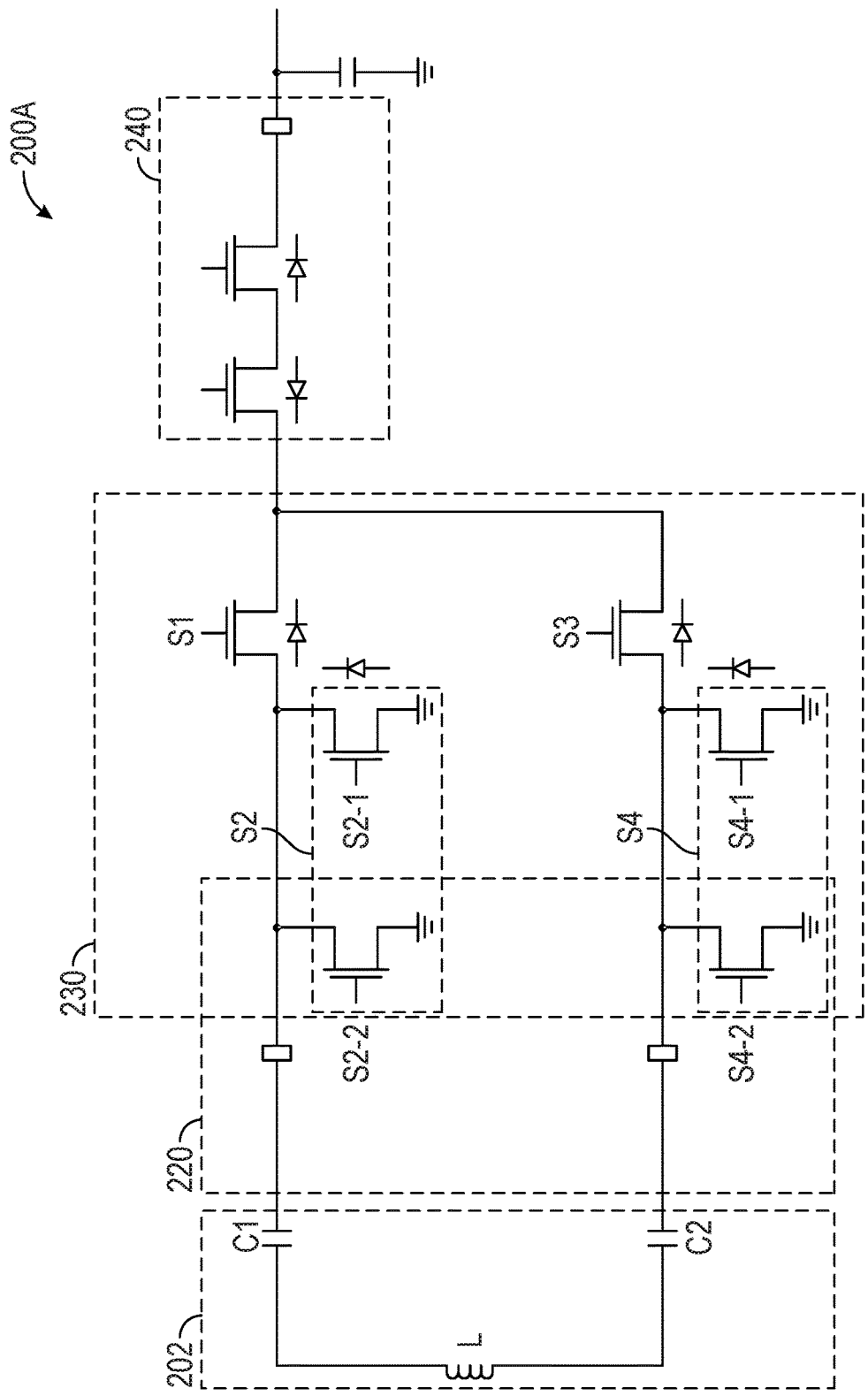
FIGS. 2A-2D are schematic diagrams illustrating an example of a WPT receiver circuit with improved load modulation circuit and corresponding evolution path circuits according to aspects of the subject technology.
Figure 2B:
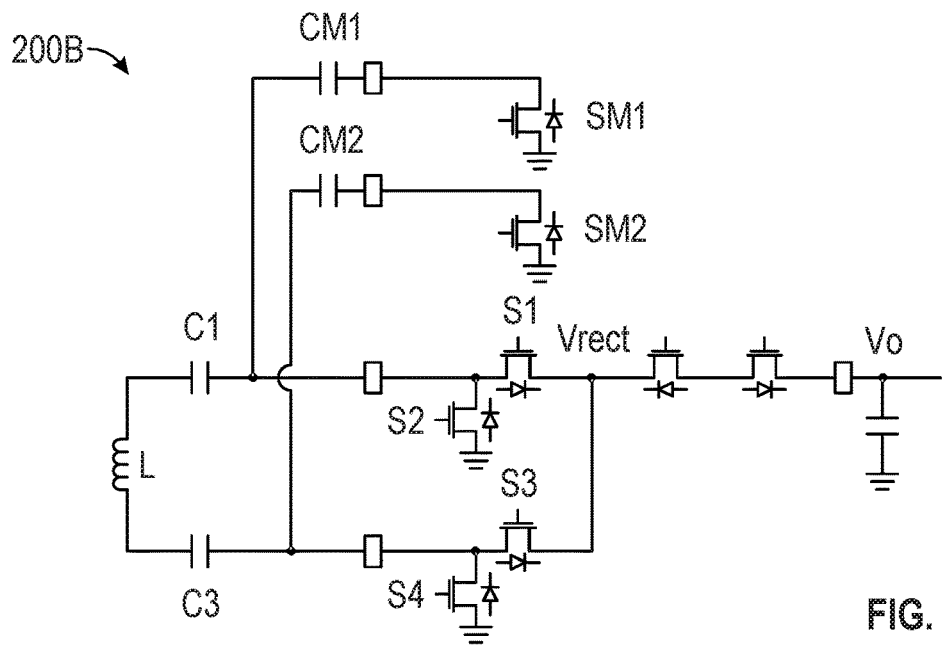
Figure 2C:
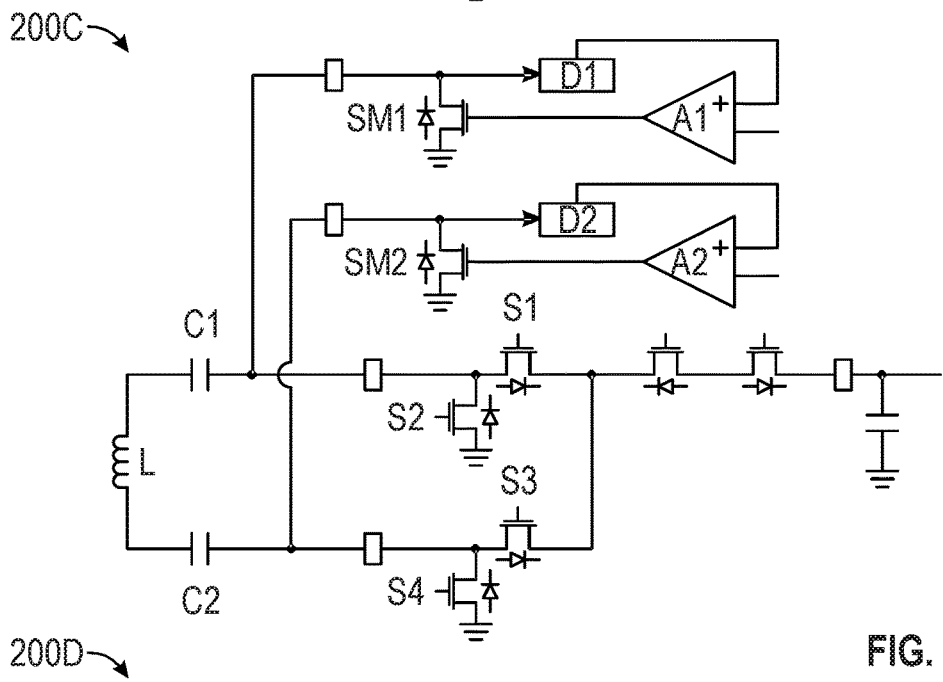

The circuit 200B of FIG. 2B shows a conventional load modulation circuit with two modulation FET switches SM1 and SM2 and two modulation capacitors CM1 and CM2. The effect of the modulation capacitors CM1 and CM2 is understood to be injecting current to or drawing current from the FET switches SM1 and SM2. In the circuit 200C of FIG. 2C, the modulation capacitors CM1 and CM2 are replaced by differentiators D1 and D2 and gain stages A1 and A2. The combination of each differentiator (e.g., D1) with a respective gain stage (e.g., A1) can emulate a capacitor current given by C dV/dt, where C is the capacitance and V is the voltage across the capacitor C. The combination of the differentiator D1 with the respective gain stage A1 can generate the dV/dt and C terms of the capacitor current. Thus, the circuit 200C of FIG. 2C can be thought of as an equivalent of the circuit 200B of FIG. 2B, in which a current pulse is injected into a resistor, such as an on-resistance of the FET switch SM1.

Figure 2D:
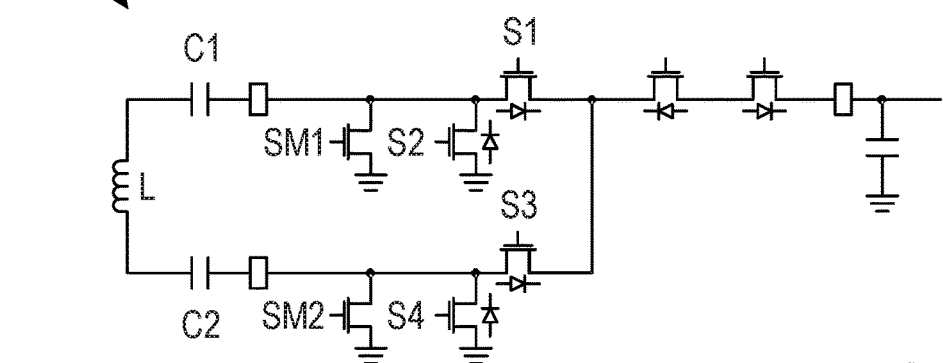

In the circuit 200D of FIG. 2D, the functionality of the differentiators D1 and the gain stage A1 is performed by providing a current via the FET switch S1 and pulsing the gate terminal of the SM1 for a short time (e.g., 100 ns). The circuit 200D is similar to the circuit 200A of FIG. 2A, in which the FET switches S2-2 and S4-2 (e.g., fingers of the FET switches S2 and S4) are respectively pulsed at the beginning of the conduction time of the FET switch S1 (e.g., positive half-cycle of the AC input voltage) and the conduction time of the FET switch S3 (e.g., negative half-cycle of the AC input voltage).

Figure 3:
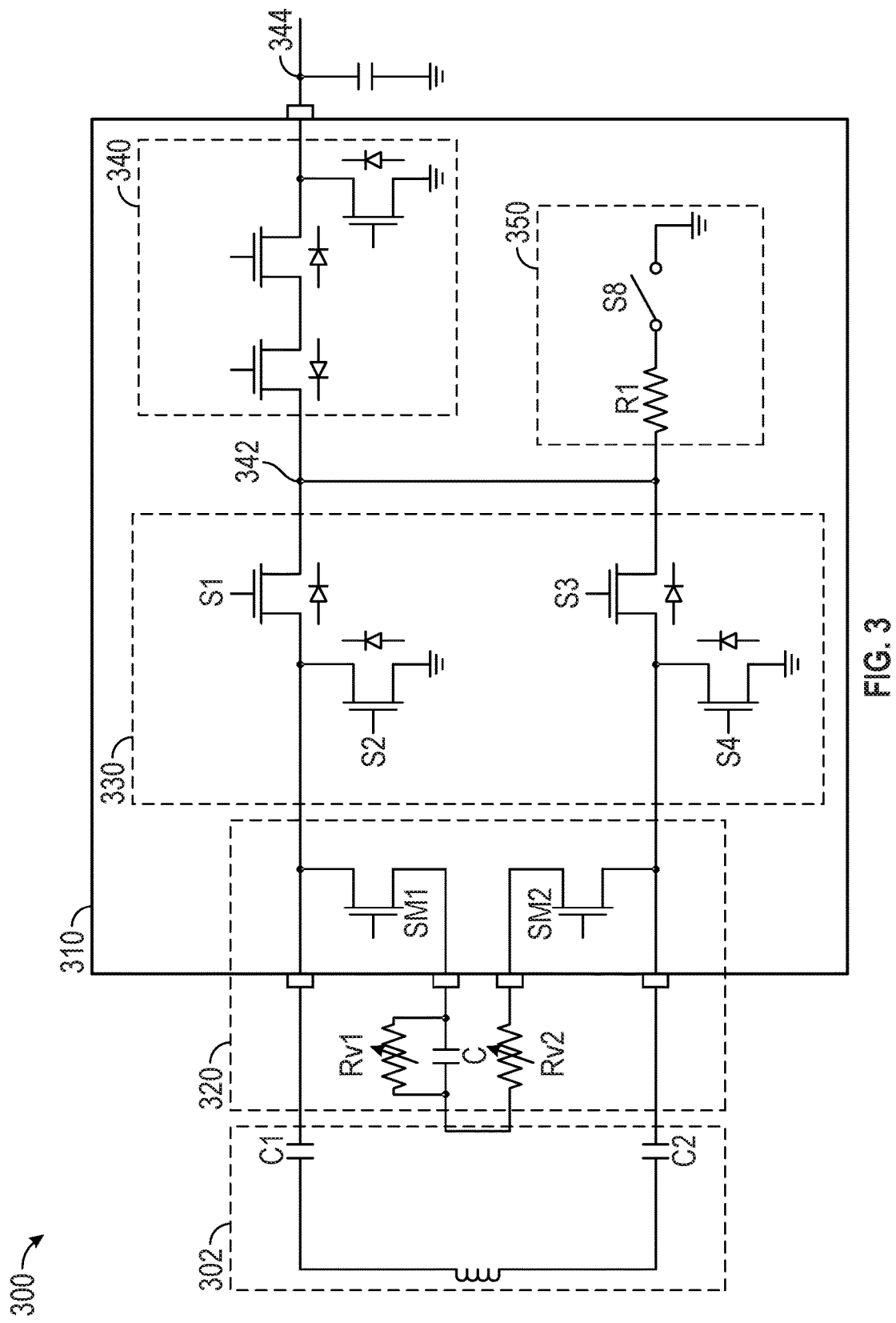
FIG. 3 is a schematic diagram illustrating an example of an improved WPT receiver with reduced oscillations according to aspects of the subject technology.

FIG. 3 is a schematic diagram illustrating an example of an improved WPT receiver 300 with reduced oscillations according to aspects of the subject technology. The WPT receiver 300 includes a magnetic coupling circuit 302, a load modulation circuit 320, a rectifier 330, a regulator 340, and an additional load circuit 350. The magnetic coupling circuit 302, the load modulation circuit 320, the rectifier 330, and the regulator 340 are similar to the magnetic coupling circuit 102, the load modulation circuit 120, the rectifier 130, and the regulator 140 of FIG. 1 as described above. The improvement in the WPT receiver 300 is due to the additional load circuit 350 that includes the resistor R1 (the additional load) and a damping switch S8 that is operable to connect the resistor R1 to ground potential when closed.

The additional load R1 adds to the amount of load introduced at the rectifier output node 342 by the regulator 340 to provide a minimum load that can significantly reduce oscillations associated with the load modulation circuit 320. In some aspects, reducing oscillations is achieved by closing the damping switch S8 to apply the damping load (e.g., R1) in a time window including a modulation event. As explained above, the modulation FET switches of the load modulation circuit 320 are controlled by a modulation pulse provided by a modulation control circuit (e.g., 126 of FIG. 1). In one or more aspects, the modulation event is the application of the modulation pulse to a gate terminal of a modulation FET switch of the load modulation circuit 320.

In some implementations, reducing the oscillations due to load modulation can be enhanced by increasing on-resistance of the modulation FET switches (e.g., SM1 and/or SM2). An additional benefit of increasing the on-resistance (Rds) of the modulation FET switches is that allows controlling of the modulation strength of the load modulation circuit.

In one or more implementations, adjustable resistors (e.g., Rv1 or Rv2) can be coupled in parallel or in series with capacitor C of the load modulation circuit 320, which would be in series with the modulation FET switches (e.g., FET switches SM1 and SM2). In some aspects, an adjustable resistance or current sink can be employed in the rectifier FET switches S2 and S4 and be turned on when the rectifier FET switches S1 and S3 are in on states.

In some implementations, values of the adjustable resistors can be determined based on a rectified output voltage ($V_{rect}$) of the rectifier 330 or an output voltage (e.g., at node 344) of the voltage regulator 340. In some aspects, adjusting the value of the adjustable resistors Rv1 or Rv2 can be performed during the time window including the modulation event. In some implementations, instead of coupling the adjustable resistors Rv1 or Rv2, a current sink, which are known circuit elements, may be coupled in series with the first set of switches.

In some aspects, when a PMOS FET or an NMOS FET with a charge pump is used for FET switches SM1 and SM2, the gate voltages of these FETS can be higher than available positive AC (ACP) and negative AC (ACN) supply voltages. In some implementations, this can be overcome by reusing the charge pump employed for the rectifier NMOS FET switches to create the higher voltage for the modulation FET switches.

Figure 4:
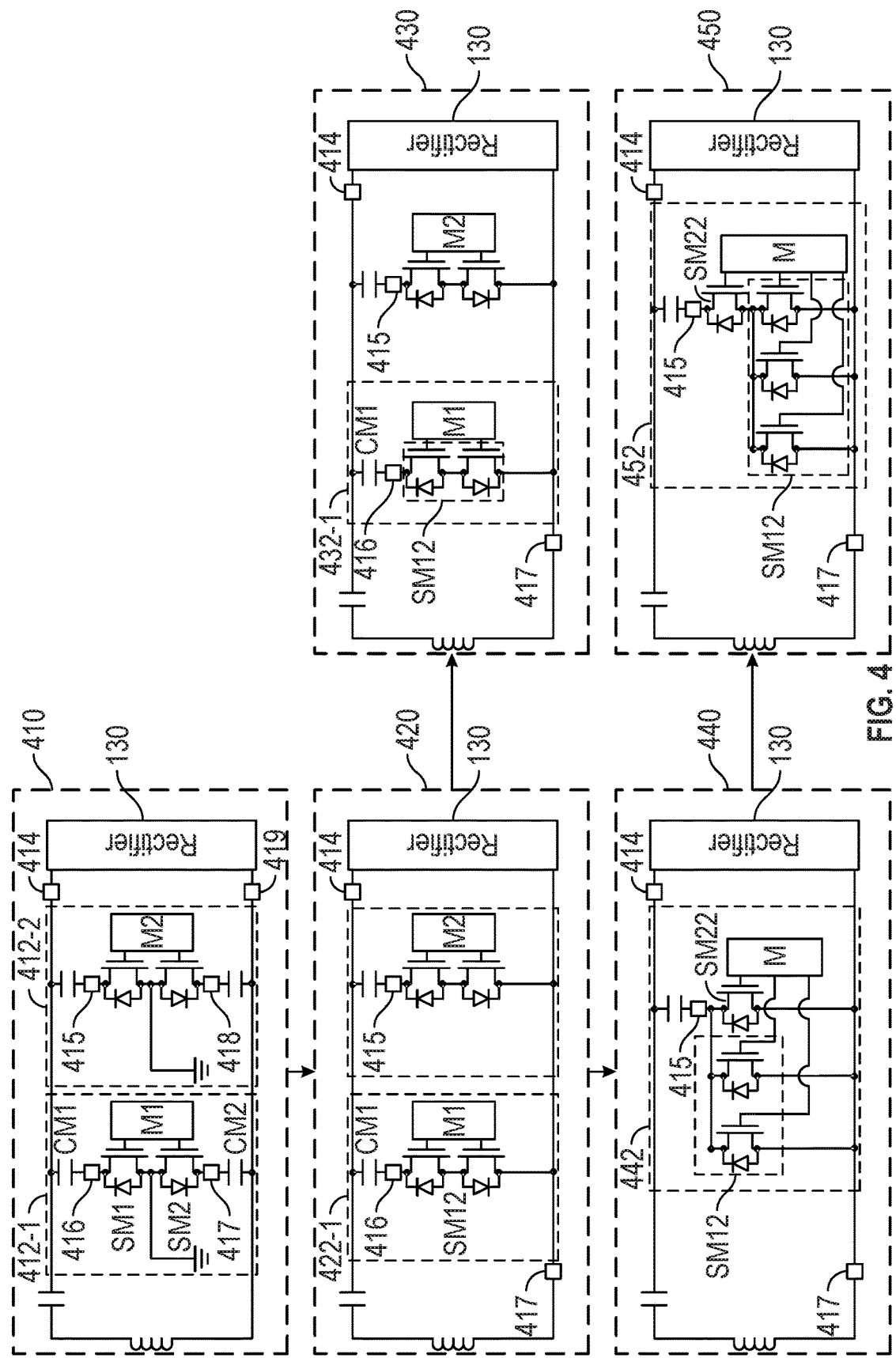
FIG. 4 is a diagram illustrating examples of WPT receiver rectifiers including improved load modulation circuits using reduced number of chip pins according to aspects of the subject technology.

FIG. 4 is a diagram illustrating examples of WPT receiver rectifiers 410, 420, 430, 440, and 450 including improved load modulation circuits using reduced number of chip pins according to aspects of the subject technology. The subject technology not only enables implementing the load modulation circuit with one modulation capacitor (e.g., 120 of FIG. 1) or without any modulation capacitors (e.g., 220 of FIG. 2A), but further facilities reducing the number of pins of the receiver chip that are used for coupling the load modulation circuit to the receiver chip, as discussed herein.

WPT receiver rectifier 410, shown in FIG. 4, is the existing solution and is shown here to emphasize the distinction of the subject technology in terms of reducing the number of modulation capacitors and the number of chip pins. The WPT receiver rectifiers 410 includes load modulation circuits 412 (e.g., 412-1 and 412-2), and a rectifier 130. Each load modulation circuit (e.g., 412-1) includes two modulation capacitors CM1 and CM2, modulation FET switches SM1 and SM2. The modulation FET switches of the load modulation circuits 412 are controlled by modulation control circuits M1 and M2. The coupling of the load modulation circuits 412 to the rectifier chip is seen to consume six pins (e.g., 414 through 419).

In the WPT receiver rectifier 420 of the subject technology, for each load modulation circuit (e.g., 422-1), the number of modulation capacitors are reduced to one (e.g., CM1) by moving the modulation FET switches to one side, as shown by SM12, and using a single control circuit (e.g., M1) to control the modulation FET switches. This has reduced the number of pins to 4 pins (e.g., 414 through 417).

The WPT receiver rectifier 430 is another version of the WPT receiver rectifier 420, in which the number of modulation capacitors is reduced to one (e.g., CM1), but the FET switches are connected in series and are separately controllable by the modulation control circuits M1 and M2. This is done while preserving the reduced number of pins (e.g., 4 pins 414 through 417).

In the WPT receiver rectifier 440, the total number of modulation capacitors is reduced to one (instead of two in 430), but the FET switch SM12 is realized by two parallel FET switches (e.g., fingers of a finger FET) which are connected in parallel with the modulation FET switch SM22. The modulation FET switches receive separate control pulses from a single modulation controller circuit M. This is done while reducing the number of pins to three (e.g., 414, 415, and 417).

The WPT receiver rectifier 450 is another version of the WPT receiver rectifier 440, in which the modulation FET switch SM12 is realized by three parallel FET switches (e.g., fingers of a finger FET) which are connected in series with the modulation FET switch SM22. The modulation FET switches receive separate control pulses from a single modulation controller circuit M. This is done while preserving the number of pins (e.g., 3 pins 414, 415, and 417). The realization of modulation FET switch SM12, as shown in the WPT receiver rectifier 450, allows varying the load impedance (e.g., capacitance and series resistance) to satisfy requirements of various standard types or operating conditions.

Figure 5:
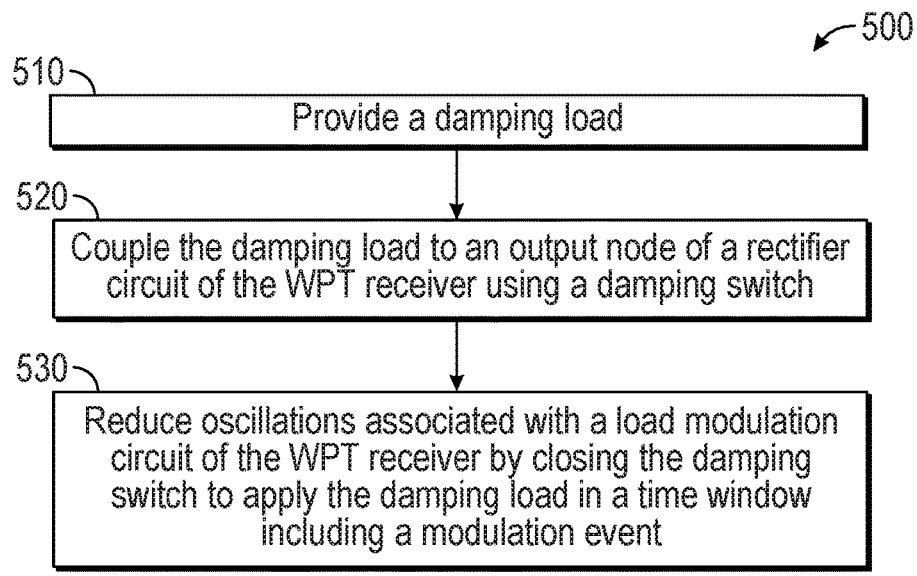
FIG. 5 is flow diagram illustrating a method of enhancing load modulation in a WPT receiver according to aspects of the subject technology.

FIG. 5 is flow diagram illustrating a method 500 of enhancing load modulation in a WPT receiver (e.g., 300 of FIG. 3) according to aspects of the subject technology. The method 500 starts with providing a damping load (e.g., R1 of FIG. 3)(510). The damping load is coupled to an output node (e.g., 342 of FIG. 3) of a rectifier circuit (e.g., 330 of FIG. 3) of the WPT receiver using a damping switch (e.g., S8 of FIG. 3) (520). Oscillations associated with a load modulation circuit (e.g., 330 of FIG. 3) of the WPT receiver are reduced by closing the damping switch to apply the damping load in a time window including a modulation event (530). The load modulation circuit (e.g., 320 of FIG. 3) includes modulation FET switches (e.g., SM1 and SM2 of FIG. 3) controlled by a modulation pulse (e.g., generated by 126 of FIG. 1). The modulation event includes application of the modulation pulse to a gate terminal of a modulation FET switch.

Figure 6:
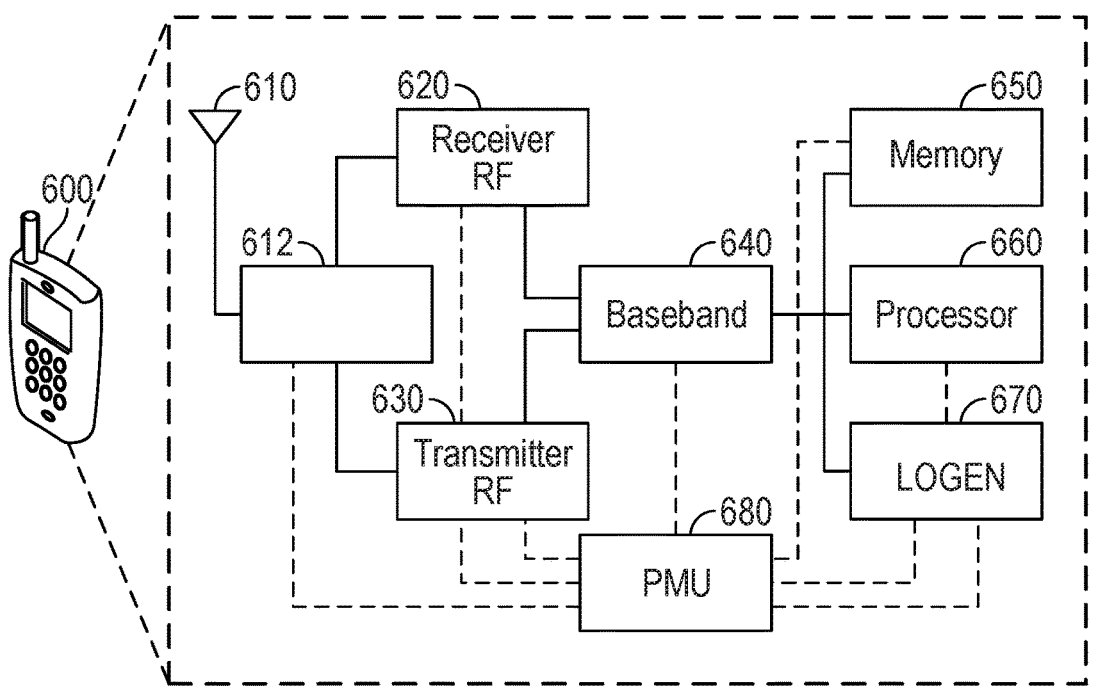
FIG. 6 is a block diagram illustrating an example wireless communication device in accordance with one or more implementations of the subject technology.

FIG. 6 is a block diagram illustrating an example wireless communication device 600 in accordance with one or more implementations of the subject technology. The wireless communication device 600 may comprise a radio-frequency (RF) antenna 610, a receiver 620, a transmitter 630, a baseband processing module 640, a memory 650, a processor 660, a local oscillator generator (LOGEN) 670, and a power management unit (PMU) 680. In various embodiments of the subject technology, one or more of the blocks represented in FIG. 6 may be integrated on one or more semiconductor substrates. For example, the blocks 620-670 may be realized in a single chip or a single system on chip, or may be realized in a multi-chip chipset.

The RF antenna 610 may be suitable for transmitting and/or receiving RF signals (e.g., wireless signals) over a wide range of frequencies. Although a single RF antenna 610 is illustrated, the subject technology is not so limited.

The receiver 620 may comprise suitable logic circuitry and/or code that may be operable to receive and process signals from the RF antenna 610. The receiver 620 may, for example, be operable to amplify and/or down-covert received wireless signals. In various embodiments of the subject technology, the receiver 620 may be operable to cancel noise in received signals and may be linear over a wide range of frequencies. In this manner, the receiver 620 may be suitable for receiving signals in accordance with a variety of wireless standards. Wi-Fi, WiMAX, Bluetooth, and various cellular standards. In various embodiments of the subject technology, the receiver 620 may not require any SAW filters and few or no off-chip discrete components such as large capacitors and inductors.

The transmitter 630 may comprise suitable logic circuitry and/or code that may be operable to process and transmit signals from the RF antenna 610. The transmitter 630 may, for example, be operable to up-covert baseband signals to RF signals and amplify RF signals. In various embodiments of the subject technology, the transmitter 630 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 630 may be operable to provide signals for further amplification by one or more power amplifiers.

The duplexer 612 may provide isolation in the transmit band to avoid saturation of the receiver 620 or damaging parts of the receiver 620, and to relax one or more design requirements of the receiver 620. Furthermore, the duplexer 612 may attenuate the noise in the receive band. The duplexer may be operable in multiple frequency bands of various wireless standards.

The baseband processing module 640 may comprise suitable logic, circuitry, interfaces, and/or code that may be operable to perform processing of baseband signals. The baseband processing module 640 may, for example, analyze received signals and generate control and/or feedback signals for configuring various components of the wireless communication device 600 such as the receiver 620. The baseband processing module 640 may be operable to encode, decode, transcode, modulate, demodulate, encrypt, decrypt, scramble, descramble, and/or otherwise process data in accordance with one or more wireless standards.

The processor 660 may comprise suitable logic, circuitry, and/or code that may enable processing data and/or controlling operations of the wireless communication device 600. In this regard, the processor 660 may be enabled to provide control signals to various other portions of the wireless communication device 600. The processor 660 may also control transfers of data between various portions of the wireless communication device 600. Additionally, the processor 660 may enable implementation of an operating system or otherwise execute code to manage operations of the wireless communication device 600. In one or more aspects that processor 660 may control the operation (e.g., closing or opening of various FET switches) of the circuits of the subject technology, for example, FET switches SM1, SM2, S1-S4, and S8 of FIG. 3 or FET switches of other figures disclosed herein. In one or more implementations, the processor 660 can perform the functionalities of the modulation control circuit 126 of FIG. 1.

The memory 650 may comprise suitable logic, circuitry, and/or code that may enable storage of various types of information such as received data, generated data, code, and/or configuration information. The memory 650 may comprise, for example, RAM, ROM, flash, and/or magnetic storage. In various embodiment of the subject technology, Information stored in the memory 650 may be utilized for configuring the receiver 620 and/or the baseband processing module 640.

The local oscillator generator (LOGEN) 670 may comprise suitable logic, circuitry, interfaces, and/or code that may be operable to generate one or more oscillating signals of one or more frequencies. The LOGEN 670 may be operable to generate digital and/or analog signals. In this manner, the LOGEN 670 may be operable to generate one or more clock signals and/or sinusoidal signals. Characteristics of the oscillating signals such as the frequency and duty cycle may be determined based on one or more control signals from, for example, the processor 660 and/or the baseband processing module 640.

In operation, the processor 660 may configure the various components of the wireless communication device 600 based on a wireless standard according to which it is desired to receive signals. Wireless signals may be received via the RF antenna 610 and amplified and down-converted by the receiver 620. The baseband processing module 640 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 650, and/or information affecting and/or enabling operation of the wireless communication device 600. The baseband processing module 640 may modulate, encode and perform other processing on audio, video, and/or control signals to be transmitted by the transmitter 630 in accordance to various wireless standards.

The PMU 680 includes a power supply that can provide power to all circuits and modules of the wireless communication device 600. The power supply can use a battery voltage or can generate a rectified and regulated voltage from the power line to support one or more voltage rails of the wireless communication device 600. In one or more aspects, the PMU 680 can include a WPT circuit including a WPT receiver circuit such as the PWT receiver circuits 100 of FIG. 1, 200A of FIG. 2A, or 300 of FIG. 3 and can use the subject technology to efficiently receive power from a WPT transmitter.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A wireless power transfer (WPT) receiver circuit comprising:
   a receive coil configured to couple to a transmit coil of a WPT transmitter circuit;
   a rectifier coupled to the receive coil and configured to generate a rectified voltage, wherein the rectifier comprises a bridge rectifier circuit including a first set of switching elements; and
   a load modulation circuit configured to facilitate communication between the WPT receiver circuit and the WPT transmitter circuit, the load modulation circuit comprising a single modulation capacitor and one or more modulation switching elements, wherein at least one node of one of the one or more modulation switching elements is connected to an input node of the rectifier, wherein the one or more modulation switching elements comprises two field-effect transistor (FET) switches, wherein the single modulation capacitor is connected between first nodes of two FET switches, and wherein the WPT transmitter circuit further comprises at least one variable resistor connected in series or in parallel with the single modulation capacitor.

2. The WPT receiver circuit of claim 1, wherein, second nodes of the two FET switches are connected to the input nodes of the rectifier.

3. The WPT receiver circuit of claim 1, wherein the one or more modulation switching elements comprises a FET switch coupled in series with the single modulation capacitor.

4. The WPT receiver circuit of claim 3, wherein the load modulation circuit comprising the FET switch coupled in series with the single modulation capacitor is coupled between input nodes of the rectifier.

5. The WPT receiver circuit of claim 4, wherein the FET switch comprises a finger FET including multiple parallel-connected FET switches, and wherein the finger FET enables changing an on-resistance of the FET switch by at least one of changing the FET fingers or a gate voltage of the FET switch.

6. The WPT receiver circuit of claim 5, wherein gate terminals of the multiple parallel-connected FET switches are independently controlled by a modulation control circuit.

7. The WPT receiver circuit of claim 1, wherein the one or more modulation switching elements comprise a FET switch coupled in series with the single modulation capacitor and a finger FET including multiple parallel-connected FET switches.

8. The WPT receiver circuit of claim 1, wherein the receiver coil is configured to electromagnetically couple to the transmit coil.

9. The WPT receiver circuit of claim 1, wherein the first set of switching elements of the bridge rectifier circuit comprise FET switches having respective gate terminal voltages controlled by a control circuit based on a voltage of a node of the load modulation circuit.

10. A wireless power transfer (WPT) receiver circuit comprising:
 a receive coil configured to couple to a transmit coil of a WPT transmitter circuit;
 a rectifier coupled to the receive coil and configured to generate a rectified voltage, wherein the rectifier comprises a bridge rectifier circuit including a first and a second pair of switching devices, and wherein each switching device of the first pair of switching devices includes at least two parallel-connected switching elements; and
 a load modulation circuit configured to facilitate communication between the WPT receiver circuit and the WPT transmitter circuit, the load modulation circuit comprising modulation switch elements wherein the modulation switch elements comprise FET switches coupled in series to adjustable resistors and to a single modulation capacitor.

11. The WPT receiver circuit of claim 9, wherein first and a second pair of switching devices comprise field-effect transistor (FET) switches, and wherein the at least two parallel-connected switching elements comprise FET switches.

12. The WPT receiver circuit of claim 11, wherein the modulation switch elements comprise two modulation FET switches, wherein each modulation FET switch is connected between an input node of the rectifier and a ground node connected to a ground potential.

13. The WPT receiver circuit of claim 12, further comprising a modulation control circuit configured to apply a modulation pulse to a gate terminal of each modulation FET switch, and wherein the modulation control circuit is configured to control an amplitude and a pulse-width of the modulation pulse to control a modulation strength of the load modulation circuit.

14. The WPT receiver circuit of claim 13, wherein the second pair of switching devices includes a first FET switch coupled between a first input node of the rectifier and a ground node connected to a ground potential and a second FET switch coupled between a second input node of the rectifier and the ground node, and wherein the first and the second FET switches incorporate a modulation FET resistance.

15. The WPT receiver circuit of claim 14, wherein the modulation control circuit is configured to apply the modulation pulse to a gate terminal of a modulation FET switch when a respective first FET switch or second FET switch connected to the modulation FET switch is conducting.

16. A method for enhancing load modulation in a wireless power transfer (WPT) receiver, the method comprising:
 providing a damping load;
 coupling the damping load to an output node of a rectifier circuit of the WPT receiver using a damping switch;
 reducing oscillations associated with a load modulation circuit of the WPT receiver by closing the damping switch to apply the damping load in a time window including a modulation event; and
 coupling an adjustable resistor in series with a first set of FET switches of the rectifier circuit, when a second set of FET switches of the rectifier circuit are conducting current,
 wherein:
  the load modulation circuit comprises modulation FET switches controlled by a modulation pulse, and
  the modulation event includes application of the modulation pulse to a gate terminal of a modulation FET switch.

17. The method of claim 16, further comprising increasing on-resistance of the modulation FET switches to enhance reducing of the oscillations and to control modulation strength of the load modulation circuit.

18. The method of claim 16, wherein each of the second set of FET switches are connected between an output node and input node of the rectifier circuit.

19. The method of claim 18, further comprising adjusting a value of the adjustable resistor based on a rectified output voltage ($V_{rect}$) of the rectifier circuit or an output voltage of a voltage regulator following the rectifier circuit, and wherein adjusting the value of the adjustable resistor is performed during the time window including the modulation event.

20. The method of claim 16, further comprising coupling a current sink in series with a first set of FET switches of the rectifier circuit, when a second set of FET switches of the rectifier circuit are conducting current, wherein each of the second set of FET switches are connected between an output node and input node of the rectifier circuit.

* * * * *